US008155033B2

(12) United States Patent
Chaudhri et al.

(10) Patent No.: US 8,155,033 B2
(45) Date of Patent: Apr. 10, 2012

(54) OPPORTUNISTIC SPECTRUM SENSING OPTIMIZATION FOR A COMMUNICATION SYSTEM

(75) Inventors: Apoorv Chaudhri, Sunrise, FL (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1009 days.

(21) Appl. No.: 11/946,306

(22) Filed: Nov. 28, 2007

(65) Prior Publication Data

US 2009/0135744 A1    May 28, 2009

(51) Int. Cl.
*H04B 7/005*    (2006.01)

(52) U.S. Cl. ........ 370/278; 370/280; 370/281; 370/329; 455/509

(58) Field of Classification Search .......................... None
See application file for complete search history.

(56) References Cited

U.S. PATENT DOCUMENTS

| | | | |
|---|---|---|---|
| 6,990,087 B2 | 1/2006 | Rao et al. | 370/330 |
| 7,206,545 B1 | 4/2007 | Kammerlander et al. | 455/63.1 |
| 7,224,977 B2 | 5/2007 | Cavalli et al. | 455/452.1 |
| 7,239,870 B2 | 7/2007 | Zhang et al. | 455/422.1 |
| 7,248,567 B2 | 7/2007 | Desgagne et al. | 370/277 |
| 2006/0084444 A1 | 4/2006 | Kossi et al. | 455/450 |
| 2007/0249341 A1* | 10/2007 | Chu et al. | 455/434 |
| 2008/0090581 A1* | 4/2008 | Hu | 455/452.1 |
| 2008/0096542 A1* | 4/2008 | Chu et al. | 455/422.1 |
| 2010/0165913 A1* | 7/2010 | Ang et al. | 370/328 |

FOREIGN PATENT DOCUMENTS

KR    20070052229    5/2007

OTHER PUBLICATIONS

IEEE 802.22—IEEE Starts Standard to Tap Open Regions in the TV Spectrum for Wireless Broadband Services—4 pages, Oct. 12, 2004.
PCT International Search Report Application No. PCT/US2008/082413 Dated Mar. 20, 2009-15 Pages.
Cordeiro C et al: An Introduction to the First Wireless Standard Based on Cognitive Radio—Dated Apr. 1, 2006-10 Pages.
Povey G J R et al: TDD-CDMA Extension to FDD-CDMA Based Third Generation Cellular System—Dated Oct. 12-16, 1997-6 Pages.
Haines R et al: Towards Integrated Wireless Systems: Inter-Mode Monitoring Techniques—Dated Jun. 26-29, 2006-6 Pages.
Corresponding Korean Patent Application No. 10-2010-7011831— Notice of Preliminary Rejection (English Translation)—Mailing Date Aug. 5, 2011.

* cited by examiner

*Primary Examiner* — Chi H Pham
*Assistant Examiner* — Shick Hom
(74) *Attorney, Agent, or Firm* — Barbara R. Doutre

(57) ABSTRACT

A combination of subscriber clustering and link interleaving provides a cognitive radio system (CR) 100 with opportunities to sense an incumbent system's spectrum on secondary basis. The CR system (100) uses clustering to identify out-of-band channels. The CR system (100) uses link interleaving during a second mode of operation to sense and detect any incumbent (120) on in-band channels. A list of out-band channels are sensed by clusters (0, 1, 2, 3) sequentially to generate a ranked list of potential channels for future use by the CR system. These out-of-band channels can be used opportunistically in case of in-band incumbent detection.

26 Claims, 7 Drawing Sheets

_500_

OPPORTUNISTIC SPECTRUM SENSING OPTIMIZATION FOR A COMMUNICATION SYSTEM

FIELD OF THE INVENTION

The present invention relates generally to communication systems and more particularly spectrum sharing amongst communication systems.

BACKGROUND

The explosive growth in wireless services over the past several years illustrates the huge and growing demand of the business community, consumers and the government for spectrum-based communications. Continuing advancements in technology, products and services are overwhelming the finite resources of the available communication spectrum. Industry has been forced to address dramatic changes, as it must adapt to accommodate the exponential demand on spectrum access, efficiency and reliability.

The Federal Communications Commission in the United States, and its counterparts around the world, allocate the radio spectrum across frequency channels of varying widths. One band can cover AM radio, another VH television, still others cell phones, citizen's-band radio, pagers, and so on. As more devices go wireless, they have to share a finite—and increasingly crowded—amount of radio spectrum. Although the radio spectrum is almost entirely occupied, not all devices use portions of the radio spectrum at the same time or location. At some locations or at some times of the day, a large percentage of the allocated spectrum may be sitting idle, even though it is officially accounted for.

Cognitive radio is a paradigm for wireless communication in which either a network or a wireless device uses spectrum that are licensed to other users or systems on a temporary secondary basis. This type of secondary access of unlicensed spectrum by a secondary system or cognitive device has to ensure minimum interference to the licensed users.

A primary system is a licensed (incumbent) user of a frequency spectrum. The primary system may be a television receiver that is within the service contour, licensed wireless microphones, or other systems governed by the FCC or other regulatory body. A secondary device could be a personal cell-phone, PDA or a communication network like a public safety network. There is an increased interest in deploying public safety devices in secondary spectrum to improve interoperability, range and data throughput and maintain mission criticality in case of emergencies and disaster management scenarios. Licensed Public Safety Networks typically utilize Frequency Domain Duplexing (FDD) as the FCC mandates paired frequencies in the Public Safety Licensed Spectrum. Conventional communication systems use Time Domain Duplexing (TDD) as means for communicating amongst radios and base stations. In order to increase spectrum availability in times of emergency or otherwise there is a need for FDD based public safety systems to utilize spectrum opportunistically on a secondary basis. Irrespective of the mode of operation, a secondary device must periodically sense for the presence of the primary and vacate that frequency or spectrum as soon as any primary activity is detected. In order to achieve this, the secondary systems utilize quiet periods during which all secondary activity is prohibited to allow the devices to sense for incumbent primary signals. Scheduling of these quiet periods is challenging and further, these periods of no activity could be longer and more frequent based on the system requirements and deployment areas thereby adversely affecting the overall network performance of the secondary system.

There is a need to protect the primary incumbent at all costs, but at the same time, manage the sensing activity in a way that minimizes the network down time.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
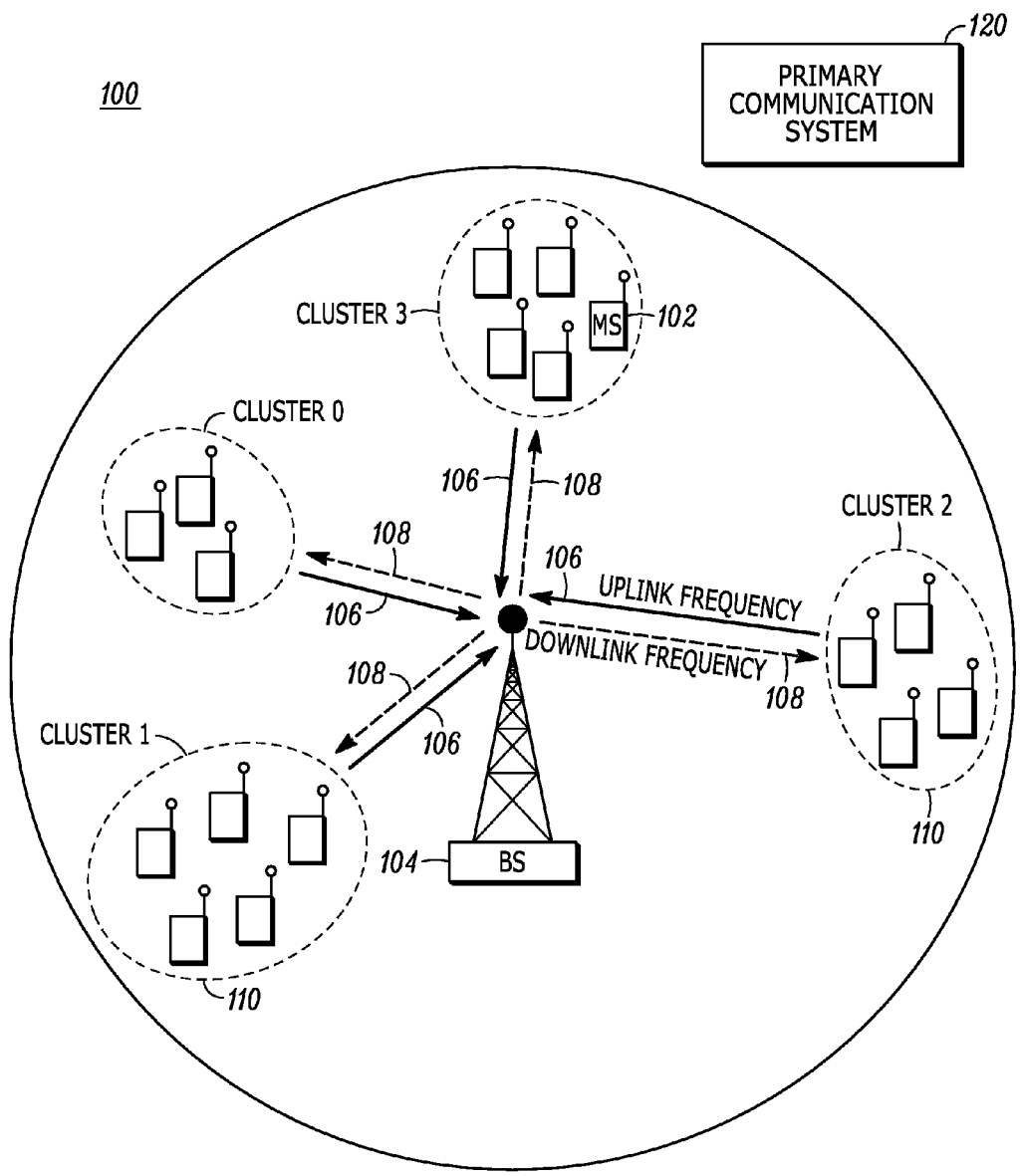
FIG. 1 illustrates a cognitive radio (CR) communication system operating in accordance with some embodiments of the invention.

Before describing in detail embodiments that are in accordance with the present invention, it should be observed that the embodiments reside primarily in combinations of method steps and apparatus components that provide optimized spectrum sharing and spectrum utilization via clustering and link interleaving for secondary FDD communication systems seeking to share spectrum with primary communication systems. For the purposes of this application a primary communication system is an incumbent user of a frequency spectrum that allows sharing of its frequency spectrum on a secondary or equal access basis with secondary systems. The secondary communication system is one which opportunistically uses the spectrum of the primary system, and is also referred to as a cognitive radio (CR) system. For the purposes of this application, in-band channels shall consist of the current cognitive radio operational channel along with one or more adjacent channels. It is important to note that adjacent channels are also considered as in-band channels to account for any spectrum leakage that is caused by the operation of the CR device. Out-of-band channels comprise channels that do not overlap with current in-band channels and can potentially be used by the CR system. Both in-band and out-of-band channels being used by the CR system fall within the frequency spectrum of the primary communication system.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for clustering of subscribers and link interleaving between systems. The non-processor circuits may include, but are not limited to, a radio receiver, a radio transmitter, signal drivers, clock circuits, power source circuits, and user input devices. As such, these functions may be interpreted as steps of a method for utilizing secondary spectrum based on clustering and link interleaving. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 illustrates a communication system 100 operating in accordance with some embodiments of the invention. Communication system 100 includes a plurality of subscriber units 102 and base station 104 which operate using a first mode of operation in conjunction with link interleaving for in-band sensing utilizing a second mode of operation to be described herein. For the purposes of example, communication system 100 will be described in terms of a plurality of subscriber units 102 and base station 104 operating using a FDD mode of operation in conjunction with link interleaving for in-band sensing capability utilizing a TDD mode of operation. The subscriber units 102 are preferably subscriber units of a public safety system seeking to share spectrum, but not interfere, with another pre-existing incumbent system (shown as primary system 120). The primary communication system 120 may be operating for example, in TV spectrum licensed to TV broadcasters and Wireless Microphone. The secondary communication system's spectrum is not limited to TV spectrum however and can include any other spectrum which can be utilized on secondary or equal access basis. Base station 104 groups the plurality of subscriber unit 102 into clusters based on physical and/or logical parameters. In FIG. 1, a plurality of clusters 110 are shown, four of which are labeled as cluster 0, cluster 1, cluster 2 and cluster 3. Base station 104 and cluster 102 communicate via an uplink frequency 106 and downlink frequency 108. Each cluster communicates with the base station 104 using the same up link frequency and down link frequency in FDD mode. Alternatively, other systems may use different uplink and downlink frequencies. In accordance with an embodiment of the invention, base station 104 provides out-of-band sensing opportunities to clusters 0, 1, 2, 3 one at a time to sense out-of-band channels, and base station 104 further provides in-band sensing opportunities for all subscribers via link interleaving to be described herein.

In accordance with the invention, the communication system of FIG. 1 comprises the plurality of clusters 110, each cluster 0, 1, 2, 3 having a plurality of subscriber units 102 communicating with the base station 104 using a FDD mode of operation. The base station 104 communicates with each cluster 0, 1, 2, 3 via an uplink frequency 106 and a downlink frequency 108. In accordance with this embodiment, the out-of-band sensing opportunity scheduling is accomplished by the base station 104 by broadcasting an out-of-band sensing scheduling data comprising a secondary channel list and other out-of-band sensing parameters like sensing duration and sensing opportunity divisor (X) to the clusters 0, 1, 2, 3 for shared spectrum utilization via downlink 108.

Each cluster 0, 1, 2, 3 performs out-of-band spectrum sensing to detect primary incumbent channels and send the sensed channel data back to the base station 104. Each cluster 0, 1, 2, 3 transmits the sensed channel data back to the base station via uplink frequency 106. This process is repeated until all of the channels have been sensed by preferably all (or alternatively a predetermined number) of clusters 0, 1, 2, 3. Once all channels are sensed by all (or the predetermined number) of clusters 0, 1, 2, 3, the base station 104 ranks all the out-of-band channels for use in case of in-band primary incumbent detection and schedules all the subscribers in the network to change to TDD operation and utilize link interleaving for in-band sensing by all the subscribers during a predetermined time interval.

The scheduling of the in-band sensing time interval is determined by a controller (not shown) within the base station 104. The scheduling of in-band sensing is based on at least one of: the number of in-band channels, type of in-band signals, integration time and subscriber location.

Figure 2:
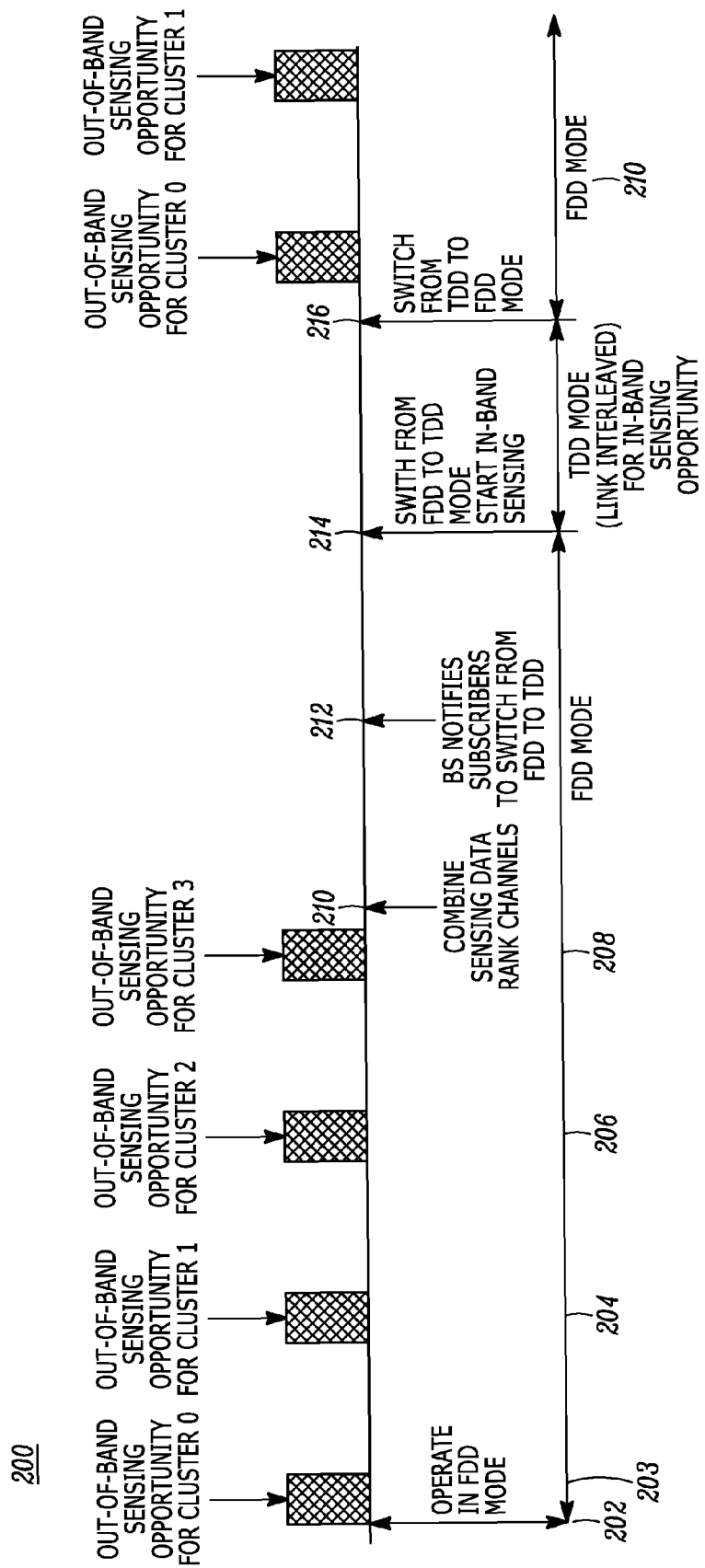
FIG. 2 illustrates a basic time line of a base station in communication with various subscribers while operating in the spectrum of a primary communication system in accordance with an embodiment of the invention.

FIG. 2 illustrates a basic time line of a base station in communication with various subscribers of a CR system operating in the spectrum of a primary incumbent system in accordance with an embodiment of the present invention. Once the CR system is operational on a channel within the incumbent's spectrum it performs in-band and out-of-band sensing for reliable and non-interfering operation of the CR system. Normal operation for all clusters begins in FDD mode at 202. The base station 104 and clusters 0, 1, 2 and 3 are sequentially notified of out-of-band sensing opportunities at 203, 204, 206, 208 based on current frame number or beacon number inherent in a communication system. The clusters 0, 1, 2, 3 perform out-of-band spectrum sensing for primary incumbent channels and send the sensed channel data back to the base station for collaborative detection and channel ranking purposes. Only one cluster senses at any point in time in order to optimize channel bandwidth utilization. The base station 104 avoids scheduling any downlink packets to subscribers that are in the process of sensing, and uses these out-of-band sensing opportunities to increase the downlink capacity of subscribers in other clusters. This will reduce the overall loss of bandwidth incurred due to sensing. The uplink between the subscribers and the base-station is unaffected by the out-of-band sensing operation.

Once the base determines that all out-of-band channels are sensed by all or a predetermined number of clusters, the base station 104 proceeds to combine the out-of-band sensing data and rank the out-of band channels at 210. Subscribers will use the highest ranked out-of-band channel when an incumbent user is detected on an in-band channel. The base station 104 then notifies at 212 all subscribers to switch to TDD link interleaving mode for in-band sensing opportunity over a predetermined time interval. All the subscribers and the base station then start operating in TDD link interleaved mode for the predetermined time interval provided by the base station notification. In-band sensing using link interleaving begins at 214 and continues until the in-band sensing time interval expires (the time interval being the same for all subscribers) and the operating mode switches back to FDD mode of operation at 216, at which time the clusters repeat the sequential out-of-band sensing at their individual opportunity. A more detailed explanation of the actual link interleaving occurring between the base station 104 and the subscribers is provided in detail in conjunction with FIG. 3.

Figure 3:
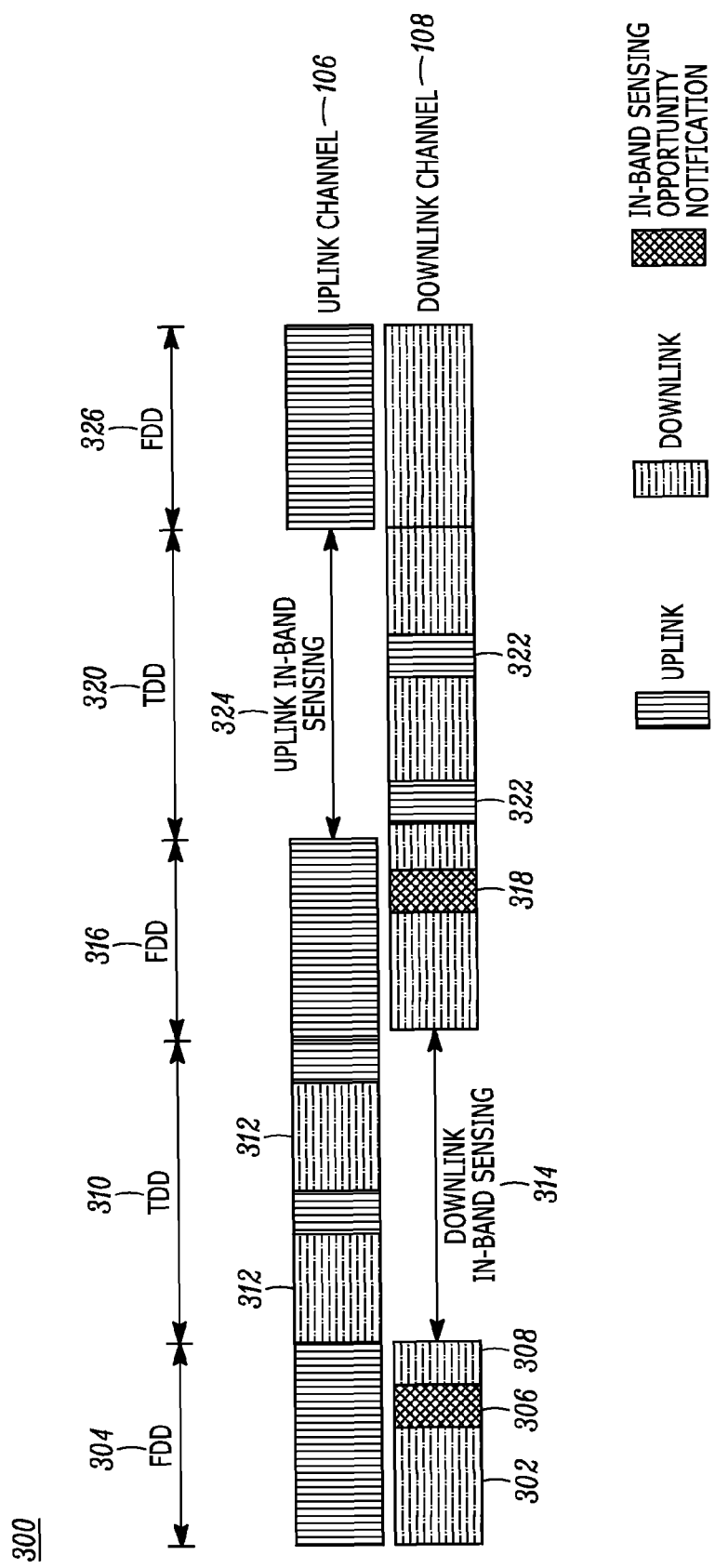
FIG. 3 illustrates an example of uplink and downlink interleaving for a CR system operating in a primary system's spectrum to perform in-band sensing in accordance with an embodiment of the invention.

FIG. 3 illustrates an example of uplink and downlink interleaving 300 for the CR system performing in-band sensing in the primary system's spectrum in accordance with an embodiment of the invention. In this example, base station 104 schedules in-band sensing opportunities for all the subscribers registered with the base station via downlink channel 108. Operation begins at 302 with normal FDD communication 304 on both the uplink channel 106 and downlink channel 108. Base station 104 transmits a notification 306 to all of the subscribers in the system of in-band sensing opportunity. The in-band sensing opportunity notification 306 identifies the sensing opportunity for uplink or downlink channel and further consists of a list of in-band channels to be sensed, the starting time of the interleaving, the duration of the in-band sensing interleaving, the map of the interleaving (designating duration and time of uplink and downlink in TDD mode). As mentioned earlier, in-band channels consist of all the channels that are affected by the current operation of the CR system on a channel in the primary system's spectrum. In response to the received sensing opportunity notification at 306, all subscribers and the base station switch at 308 to TDD mode of operation for the predetermined in-band sensing time 310. In this example, downlink in-band sensing is performed at 314, thus downlink is interleaved 312 on the uplink channel 106. While interleaving downlink 312 on the uplink channel 106, the downlink channel 108 remains quiet and provides in-band sensing opportunity 314 on downlink channel. As stated previously, the downlink channel in-band sensing 314 time interval is scheduled by base station 104. At the expiration of the time interval, operation returns to FDD mode 316.

Operation continues in FDD mode 316 until another in-band sensing opportunity notification 318 arises in the downlink channel 108 causing operation to switch to TDD mode 320. Note that notification always occurs in the downlink channel. In this example, the in-band sensing notification 318 comprises an uplink channel, and the uplink is interleaved at 322 on the down link channel 108 while the base and the subscribers perform uplink in-band sensing 324 on the uplink channel 106 over a scheduled uplink in-band sensing time interval. During the scheduled time interval of uplink in-band sensing 324, no transmission occurs on the uplink channel 106. Once the scheduled time interval of uplink in-band sensing 324 has elapsed, operation reverts back to normal FDD mode at 326.

Figure 4:
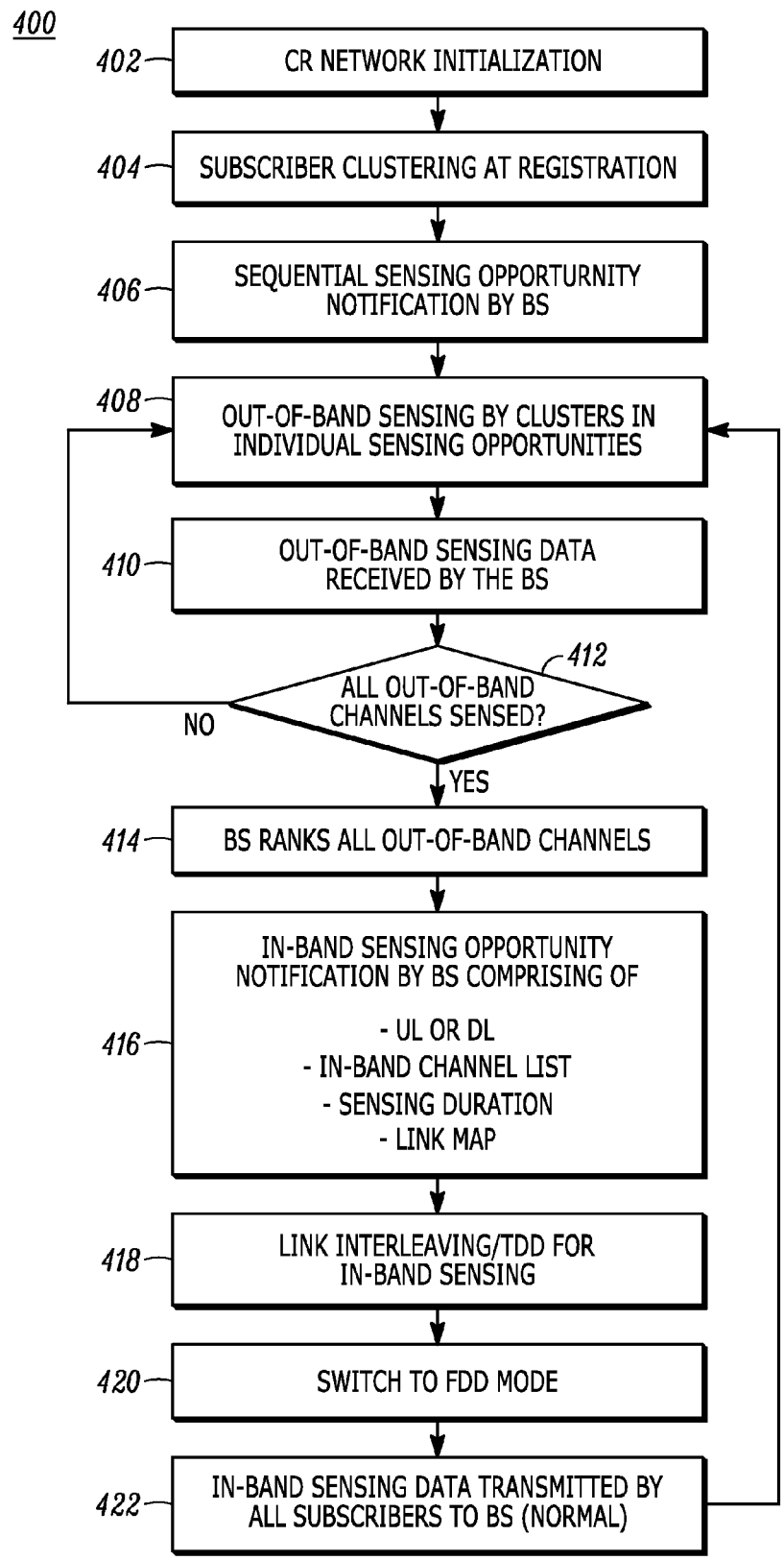
FIG. 4 summarizes a system level operation of the CR system in a secondary spectrum in accordance with an embodiment of the invention.

FIG. 4 summarizes a system level operation of the CR system in the primary system's spectrum. The method 400 provides a subscriber clustering scheme for out-of-band sensing and link interleaving for in-band sensing in accordance with an embodiment of the invention. Method 400 begins with network initialization in FDD mode in primary system's spectrum. The subscribers begin by registering with the CR system and are grouped into clusters by the base station at 404, the clustering being based on logical and/or physical clustering technique to be described later in conjunction with FIG. 6. At 406, sequential notification of out-of band sensing opportunities is provided by the base station to the clusters using frame number or beacon number inherent in a communication system. At 408, out-of-band spectrum sensing is performed by the clusters in individual sensing opportunities in response to the sequential notification. At 410, out-of-band sensing data is transmitted by the subscribers in the clusters to the base station. Once the base station determines that all out-of-band channels are sensed by all (or a predetermined number) of the clusters, the base station 104 ranks all the out-of-band channels at 414 based on the out-of band sensing data received from the subscribers. Next, in-band sensing opportunity notification by the base station occurs at 416 leading to link interleaving in TDD mode for either uplink channel or downlink channel in-band sensing at 418. After a predetermined time interval, all subscribers and base station revert back to FDD mode at 420. The base station then returns to normal operation and receives in-band sensing data from all subscribers in FDD mode 422. The in-band sensing data is combined by the base station for in-band primary incumbent detection.

Figure 5:
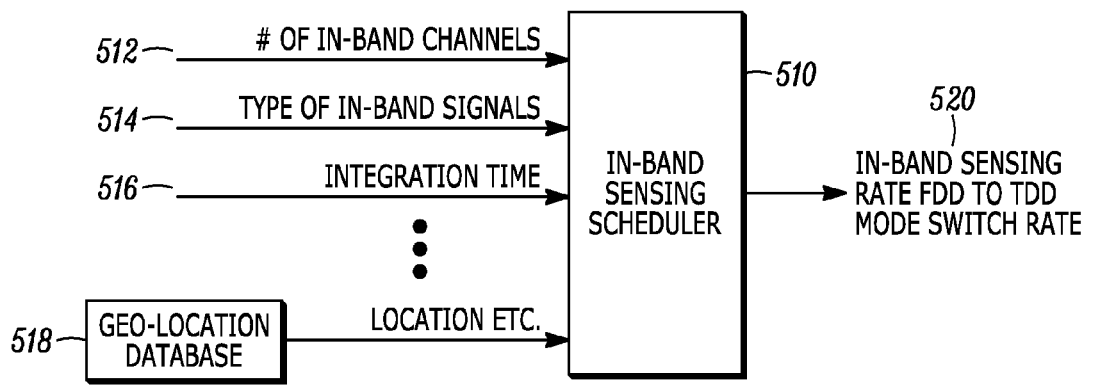
FIG. 5 illustrates a block diagram of an in-band sensing scheduler and out-of-band sensing scheduler in accordance with some embodiments of the invention.
Figure 5:
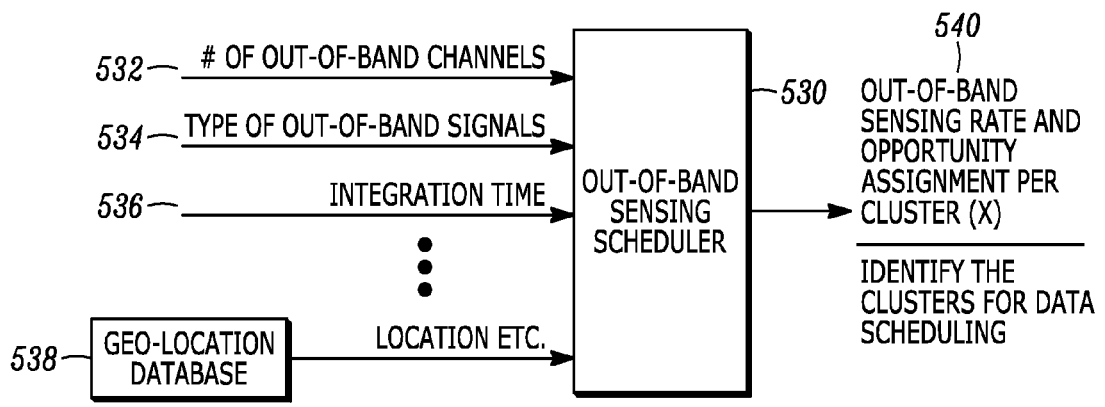

FIG. 5 illustrates a block diagram of an in-band sensing scheduler and out-of-band sensing scheduler in accordance with some embodiments of the invention. In-band sensing scheduler 510 is preferably a controller within base station 104 which takes one or more in-band characteristics, including but not limited to, the number of in-band channels 512, type of in-band signals 514, integration time 516, location of a base station and/or location of subscriber units within a cluster as maintained in a geo-location database of the controller 518. Some or all of these in-band parameters can be used to determine the number of in-band channels to sense, the rate at which to switch from FDD to TDD and back to FDD and the duration of the in-band sensing time interval. Again, the timing rate of packets and the time interval for in-band sensing may vary from system to system based on location, maximum transmit power and RF characteristics of the devices in the system. Thus, the link interleaving provides a dynamic means of using a primary system's spectrum by a base station of a secondary system without the loss of system bandwidth and with reduced affect on the secondary system's throughput. More importantly, both UL and DL are maintained. This helps in maintaining time synchronization and further enables the base-station scheduler to optimize the DL and UL reservations to the subscribers.

Out-of-band sensing scheduler 530 is preferably part of the same controller within base station 104 and takes one or more out-of-band characteristics, including but not limited to, the number of out-of-band channels, type of out-of-band signals, integration time, location of a base station and/or location of subscriber units within a cluster as maintained in a geo-location database of the controller. Some or all of these out-of band parameters can be used to determine the out-of-band sensing rate using sensing opportunity divisor (X) and opportunity assignment per cluster 540, an example of which is provided later. The out-of-band scheduler also continuously identifies sensing opportunities for clusters and thus identifies clusters which can receive data packets from the base station while one of the clusters is performing out-of-band sensing.

Figure 6:
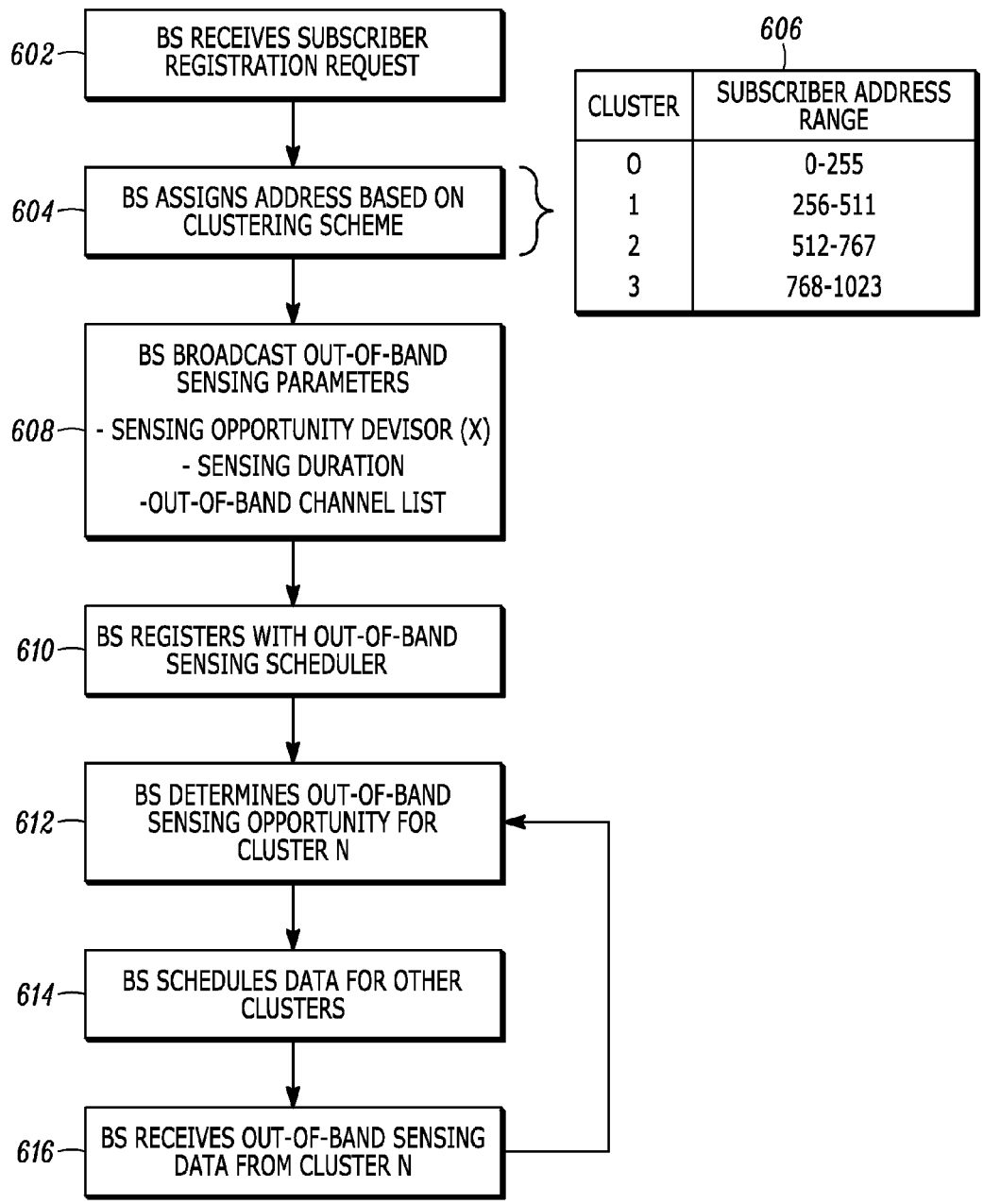
FIG. 6 is a method of subscriber clustering used to perform out-of-band sensing in a FDD system in accordance with an embodiment of the invention.

FIG. 6 is a method of subscriber clustering used to perform out-of-band sensing in FDD mode in accordance with an embodiment of the invention. Beginning at 602, the base station receives registration requests from one or more subscribers. At 604, the base station assigns an address to each subscriber corresponding to a cluster. As seen in 606, a plurality of clusters are assigned to addresses with predetermined ranges. In the example shown in 606, three clusters 0, 1, 2, and 3 are assigned subscriber addresses within the ranges of 0-255 (cluster 0); 256-511 (cluster 1), 512-767 (cluster 2); 768-1023 (cluster 3). The number of clusters and the range of subscriber addresses are shown for example purposes only as different systems may have more or less clusters and thus need more or less addresses. At 608, the base station broadcasts out-of-band sensing parameters, the out-of-bound parameters being sensing opportunity divisor (X); sensing time duration; and out-of-band channel list. At 610, the base station registers subscribers with an out-of-band scheduler using the assigned addresses. At 612, both base station and subscribers identify an out-of band sensing opportunity for a given cluster (N). The subscribers then perform the out-of-band sensing when the opportunity belongs to that subscriber while the base station schedules data for other clusters at 614.

The following equation is used to determine when a sensing opportunity for a cluster arrives:

$$|FC-SC|\%(4/X)=Y$$

where:
FC=current beacon or frame number
SC=sensing cluster (0 . . . N)
X=sensing opportunity divisor; and
Y=0-sensing opportunity.

As mentioned previously, the sensing opportunity divisor (X) is a parameter which is broadcast by the base station along with the out-of-band sensing duration and the out-of-band channel list to be sensed.

Figure 7:
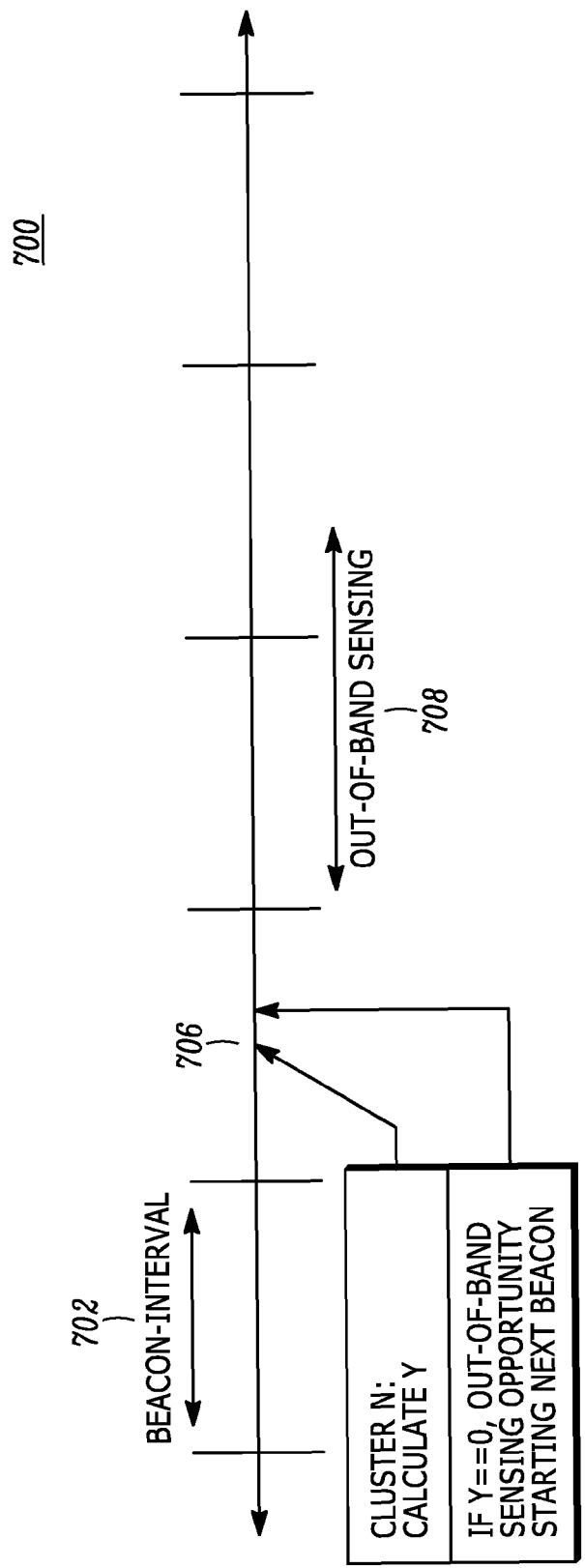
FIG. 7 shows an example of out-of-band sensing by a cluster starting at a beacon boundary in accordance with an embodiment of the invention.

Testing for a sensing opportunity is performed by all the subscribers and the base station before each frame/beacon to determine if the next sensing opportunity starting at the frame or the beacon boundary belongs to a cluster or not. In the case of the base station this information is used to schedule packets for other clusters and in the case of the subscribers this information is used to start sensing if Y=0. FIG. 7 shows an example of out-of-band sensing by a cluster starting at a beacon boundary. Time line 700 shows beacon intervals 702 for a cluster N. Prior to the next beacon 706, the value of the sensing opportunity (Y) is calculated and if equal to 0 (zero) then out-of-band sensing occurs at 708.

The Table below provides an example out-of-band sensing opportunity (OB SO) for a plurality of Clusters (N) vs. Beacon or Frame number when the sensing opportunity divisor is X=1.

| CLUSTER (N) | BEACON/FRAME NUMBER | | | | |
|---|---|---|---|---|---|
| | 0 | 1 | 2 | 3 | 0 |
| 0 | OB SO | | | | OF SO |
| 1 | | OB SO | | | |
| 2 | | | OF SO | | |
| 3 | | | | OF SO | |

The occurrence of OB SO within the Table indicates that a sensing opportunity for the sensing cluster exists after that beacon or frame number. The blank spaces within the Table indicate clusters to which the base station can transmit user/network data to those clusters that do not have current sensing opportunities.

The combination of clustering and link interleaving provided by the present invention allows FDD based cognitive radio public safety systems to operate in a spectrum on secondary basis, such as TV spectrum used by wireless microphone or television. The CR system uses clustering and link interleaving to identify a list of potential channels ranked in order of usability which can be used opportunistically in case of in-band incumbent detection. While clustering is used for out-of-band sensing and does not require link interleaving, the out-of-band sensing provides a rank list of alternate channels in the secondary spectrum which can be used by the CR system. Thus, clustering provides a means of optimizing out-of-band sensing.

In accordance with the present invention, link interleaving is used for in-band sensing and is used by all subscribers, no clustering is required during link interleaving. In-band sensing is required for the detection of on-channel primary incumbent users. Link interleaving based in-band sensing provides a method to optimize in-band sensing, particularly useful in FDD systems.

The spectrum sensing provided by the present invention can also be used by conventional TDD systems where in link interleaving can be performed by switching the operating frequency consisting of interleaved uplink and downlink to generate in-band sensing opportunities. The out-of-band sensing opportunities can still be assigned on a cluster by cluster basis in the case of TDD systems for efficient utilization of system throughput. The spectrum sensing provided by the present invention can also be extended to systems that support multiple uplink-downlink frequency pairs. In such a scenario, scheduling of in-band sensing and link interleaving will be done on groups of devices that use the same uplink (UL) and downlink (DL) frequency pair.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A secondary communication system seeking to share spectrum with a primary communication system, the secondary communication system comprising:
   a plurality of subscriber units; and
   a base station communicating with the plurality of subscriber units using first and second operating modes, the second operating mode being used in conjunction with link interleaving to generate in-band sensing opportunities for the plurality of subscribers, wherein the base station groups the plurality of subscribers into a plurality of clusters, the plurality of clusters being sequentially notified of out-of-band sensing opportunities and to perform out-of-band spectrum sensing of the primary communication system's channels, and the plurality of clusters send sensed channel data back to the base station, and the base station performs channel ranking based on the sensed channel data.

2. The secondary system of claim 1, wherein the in-band sensing opportunities occur on at least one of an uplink channel or a downlink channel.

3. The secondary system of claim 2, wherein the in-band sensing comprises downlink in-band sensing on the downlink channel or uplink in-band sensing on the uplink channel during the second operating mode.

4. The secondary system of claim 1, wherein the link interleaving comprises at least one of a downlink being interleaved on an uplink channel or an uplink being interleaved on a downlink channel during the second operating mode.

5. The secondary system of claim 1, wherein the base station transmits a notification during the first operating mode to notify the plurality of subscribers to begin in-band sensing.

6. The secondary system of claim 5, wherein the notification identifies the sensing opportunity as occurring on an uplink channel or a downlink channel, a list of in-band channels to be sensed, a starting time for the interleaving, a duration time for the in-band sensing interleaving, and a map designating start and duration time of uplink and downlink in the secondary mode.

7. A secondary communication system seeking to share spectrum with a primary communication system, the secondary communication system comprising:
a plurality of subscriber units; and
a base station communicating with the plurality of subscriber units using first and second operating modes, the second operating mode being used in conjunction with link interleaving to generate in-band sensing opportunities for the plurality of subscribers, the first mode of operation being a Frequency Domain Duplexing (FDD) mode and the second mode of operation being a Time Domain Duplexing (TDD) mode.

8. The secondary system of claim 7, wherein the base station groups the plurality of subscribers into a plurality of clusters, the plurality of clusters being sequentially notified of out-of-band sensing opportunities and to perform out-of-band spectrum sensing of the primary communication system's channels.

9. The secondary system of claim 8, wherein the plurality of clusters send sensed channel data back to the base station.

10. The secondary system of claim 9, wherein the base station performs channel ranking based on the sensed channel data.

11. A secondary communication system seeking to share spectrum with a primary communication system, the secondary communication system comprising:
a plurality of subscriber units; and
a base station communicating with the plurality of subscriber units using first and second operating modes, the second operating mode being used in conjunction with link interleaving to generate in-band sensing opportunities for the plurality of subscribers, wherein the base station groups the plurality of subscribers into a plurality of clusters, the plurality of clusters being sequentially notified of out-of-band sensing opportunities and to perform out-of-band spectrum sensing of the primary communication system's channels, wherein the clusters are sequentially notified of out-of-band sensing opportunities based on at least one of a current frame number or a beacon number.

12. A secondary communication system seeking to share spectrum with a primary communication system, the secondary communication system comprising:
a plurality of subscriber units; and
a base station communicating with the plurality of subscriber units using first and second operating modes, the second operating mode being used in conjunction with link interleaving to generate in-band sensing opportunities for the plurality of subscribers, wherein the base station groups the plurality of subscribers into a plurality of clusters, the plurality of clusters being sequentially notified of out-of-band sensing opportunities and to perform out-of-band spectrum sensing of the primary communication system's channels, wherein the base station notifies the plurality of clusters to switch from the first operating mode to the second operating mode when all of the out-of-band spectrum have been sensed by a predetermined number of clusters, and wherein the plurality of subscribers perform in-band sensing using link interleaving during the second operating mode.

13. A method of a secondary communication system to share spectrum with a primary communication system, the method comprising the steps of:
at the secondary system:
registering subscriber units with a base station;
clustering the subscriber units based on address assignment at the time of registration;
sensing for out-of-band channels within the primary system's spectrum while operating in frequency domain duplex (FDD) mode;
generating a ranked list of potential channels based on the sensed out-of-band channels;
notifying the subscriber units to start in-band sensing in response to all the out-of-band channels being sensed by a predetermined number of clusters;
interleaving uplink in-band sensing on a downlink channel using TDD mode;
reverting back to FDD mode when a predetermined uplink in-band sensing time has expired;
interleaving downlink in-band sensing on an uplink in-band channel using TDD mode; and
reverting back to FDD mode when a predetermined downlink in-band sensing time has expired.

14. The method of claim 13, wherein the step of sensing for out-of-band channels comprises the step of sequentially sensing for out-of-band channels within the primary system's spectrum while operating in frequency domain duplex (FDD) mode.

15. A cognitive radio (CR) communication system for sharing spectrum with an incumbent communication system, the CR system comprising:
a plurality of subscriber units grouped into a plurality of clusters;
a base station communicating with the plurality of subscribers via frequency division duplexing (FDD) using an uplink frequency and a downlink frequency;
the plurality of clusters performing out-of-band spectrum sensing to detect primary incumbent channels and transmit sensed channel data from the detected incumbent channels back to the base station via the uplink frequency until a predetermined number of channels have been sensed by a predetermined number of the plurality of clusters; and
the base station ranking all the out-of-band spectrum for use in case of in-band incumbent detection on an in-band channel and the base station scheduling all of the plurality of subscribers to change to TDD operation and utilize link interleaving for in-band sensing during a predetermined time interval.

16. The CR system of claim 15, further comprising a controller within the base station and wherein the scheduling of the in-band sensing time interval is determined by the controller.

17. The CR system of claim 15, wherein the scheduling of the in-band sensing is based on at least one of: the number of in-band channels, type of in-band signals, integration time and subscriber location.

18. A cognitive radio (CR) communication system for sharing spectrum with an incumbent communication system, the CR system comprising:
- a plurality of subscribers grouped into a plurality of clusters;
- a base station communicating with the plurality of clusters via a frequency domain duplexing (FDD) mode, the base station providing a sequential sensing opportunity to each cluster for out-of-band sensing over a predetermined out-of-band sensing time interval; and
- wherein upon a determination that all out-of-band channels are sensed by a predetermined number of clusters, the base station ranks the out-of-band channels;
- the plurality of subscribers changing to time domain duplexing (TDD) operation utilizing link interleaving for in-band sensing during a predetermined in-band sensing time interval.

19. The CR system of claim 18, wherein the base station and the plurality of subscribers return to the FDD mode upon the expiration of the predetermined in-band sensing time interval.

20. The CR system of claim 18, wherein the base station sends an in-band sensing opportunity notification to the plurality of subscribers which includes whether the in-band sensing is to be performed on an uplink or downlink frequency, an in-band channel list, sensing duration and link map.

21. The CR system of claim 19, wherein the in-band sensing notification occurs in a downlink channel.

22. The CR system of claim 20, wherein the base station includes a controller providing an in-band sensing scheduler and an out-of-band sensing scheduler for controlling in-band and out-of-band sensing while maintaining uplink and downlink synchronization.

23. The CR system of claim 21, wherein both the base station and plurality of subscribers identify out-of band sensing opportunities for a given cluster (N) of the plurality of clusters.

24. The CR system of claim 22, wherein out-of-band sensing opportunity scheduling is accomplished by the base station broadcasting an out-of-band sensing scheduling data comprising a secondary channel list and out-of-band sensing parameters.

25. The CR system of claim 23, wherein the out-of-band sensing parameters include an out-of-band sensing duration time and an out-of-band channel list to be sensed along with a sensing opportunity divisor (X).

26. The CR system of claim 24, wherein the following equation is used to determine when an out-of-band sensing opportunity for a given cluster (N) of the plurality of clusters arrives:

$$|FC-SC|\% \, (4/X) = Y$$

where:
FC=current beacon or frame number
SC=sensing cluster (0 . . . N)
X=sensing opportunity divisor; and
Y=0-sensing opportunity.

* * * * *